Oct. 14, 1969 W. R. ROESCHEN 3,472,291

BAG FILLING MACHINE

Filed Feb. 15, 1967 6 Sheets-Sheet 3

INVENTOR
WILLIAM R. ROESCHEN
BY Whittemore
Hulbert & Belknap

ATTORNEYS

INVENTOR.
WILLIAM R. ROESCHEN
BY Whittemore, Hulbert & Belknap
ATTORNEYS

Oct. 14, 1969 W. R. ROESCHEN 3,472,291
BAG FILLING MACHINE
Filed Feb. 15, 1967 6 Sheets-Sheet 5

INVENTOR.
WILLIAM R. ROESCHEN
BY Whittemore,
Hulbert & Belknap
ATTORNEYS

Oct. 14, 1969  W. R. ROESCHEN  3,472,291
BAG FILLING MACHINE
Filed Feb. 15, 1967  6 Sheets-Sheet 6

INVENTOR
WILLIAM R. ROESCHEN

BY
ATTORNEYS

United States Patent Office 3,472,291
Patented Oct. 14, 1969

3,472,291
BAG FILLING MACHINE
William R. Roeschen, Atlanta, Ga., assignor, by mesne assignments, to Douglas & Lomason Company, Detroit, Mich., a corporation of Michigan
Filed Feb. 15, 1967, Ser. No. 616,248
Int. Cl. B65b 1/28, 3/22, 1/20
U.S. Cl. 141—71
18 Claims

ABSTRACT OF THE DISCLOSURE

A machine for filling bags with non-free-flowing or fibrous material such as shredded bark comprising a rotor unit having a plurality of vertically disposed open-ended cylindrical containers rotatable as a unit about a vertical axis, and indexing means for indexing the rotor unit through a number of stations. During each cycle of operation a hopper feed means at one of the stations fills the container at such station with material, and a power operated ram at a different station drives the material downwardly out of the container at such different station into a bag clamped to a bag spout.

SUMMARY OF THE INVENTION

This invention relates to an automatically operated machine for filling bags with a measured amount of bulk material, such as shredded bark or other non-free-flowing bulk material, and has particular reference to a machine of this type in which a plurality of cylindrical chutes or containers are successively filled with measured amounts of the material and the contents of the filled containers are successively forcibly expelled or driven therefrom into a bag.

In general the machine comprises a supporting framework having a rotor unit mounted thereon including a plurality of vertically disposed containers open at their upper and lower ends and rotatable as a unit about a vertical axis through a number of stations corresponding to the number of containers, a feed hopper above the rotor unit at one of such stations for filling the container at such station with material to be packaged, a bag spout at a different one of the stations in alignment with the container at such different station, a power operated ram means above the rotor unit and in alignment with the bag spout and operable to forcibly drive the material from a container downwardly through the bag spout into a bag which is clamped to the bag spout. A power operated indexing means moves the rotor unit through its successive stations in timed relation to the operation of the power operated ram and the power operated bag clamping means. The present invention provides an automatic continuously operated machine for filling bags with various bulk materials, such as shredded bark, which are essentially non-free-flowing and have heretofore been very difficult to handle and package in properly measured quantities. It has been found that bulk material, such as shredded bark or other fibrous or non-free-flowing material, can be efficiently and rapidly measured and packed into bags by the machine described herein.

In the drawings:

FIGURE 7 is a vertical sectional view taken on line 7—7 of FIGURE 2;

DETAILED DESCRIPTION

Figure 1:
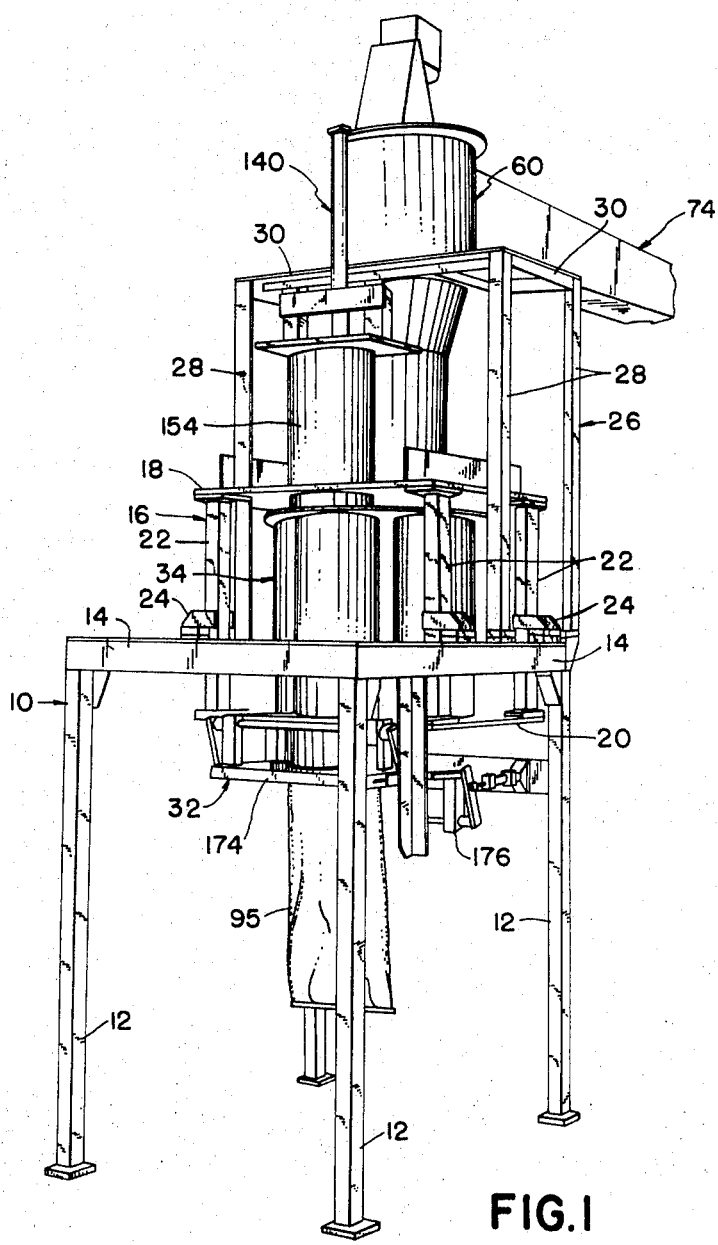
FIGURE 1 is a perspective view of a bag filling machine according to this invention.
Figure 2:
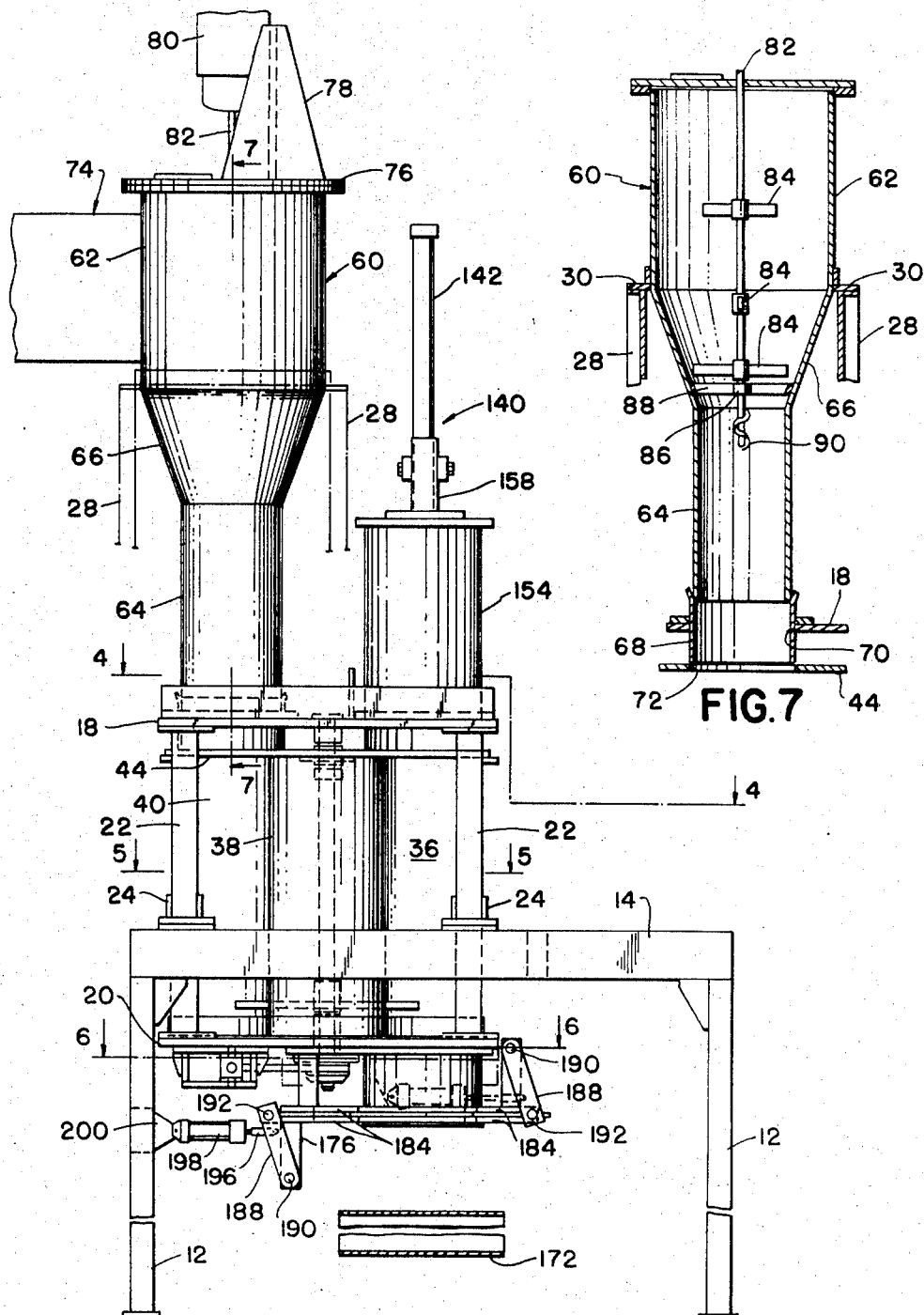
FIGURE 2 is a side elevational view of the machine.
Figure 3:
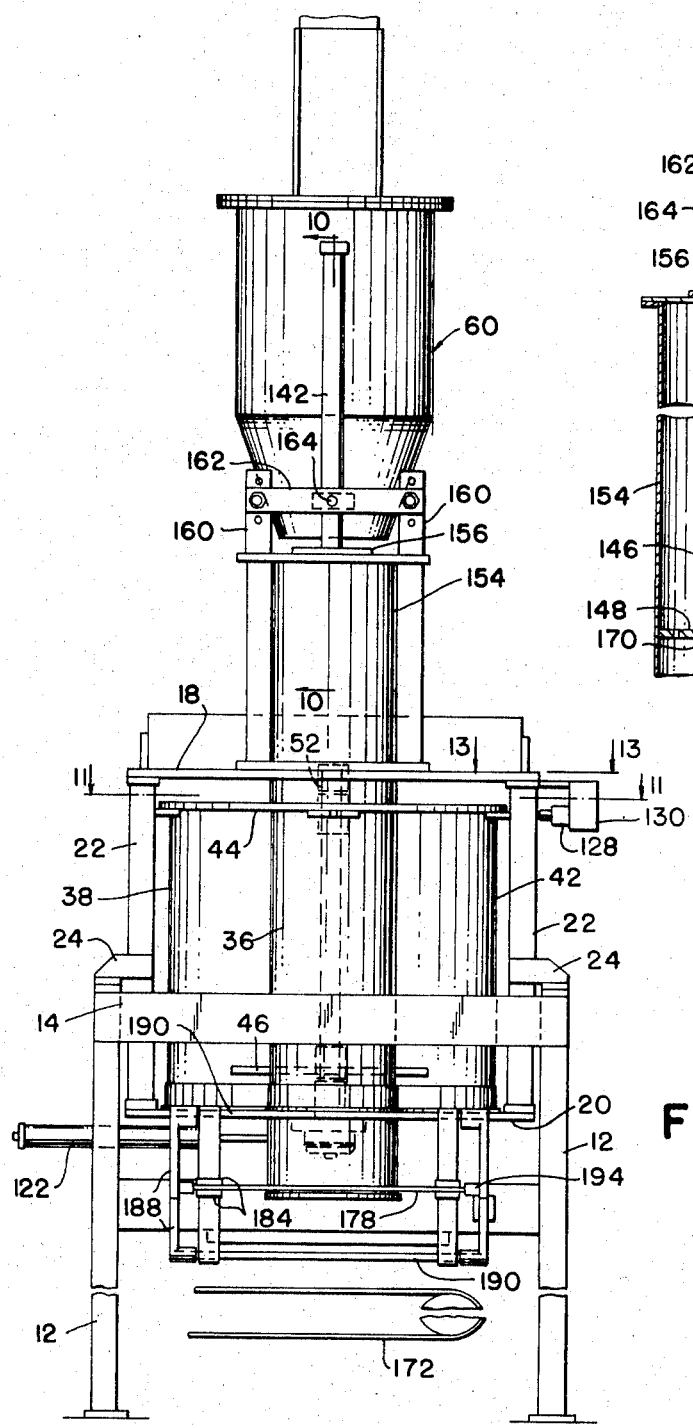
FIGURE 3 is a front elevational view of the machine.
Figure 10:
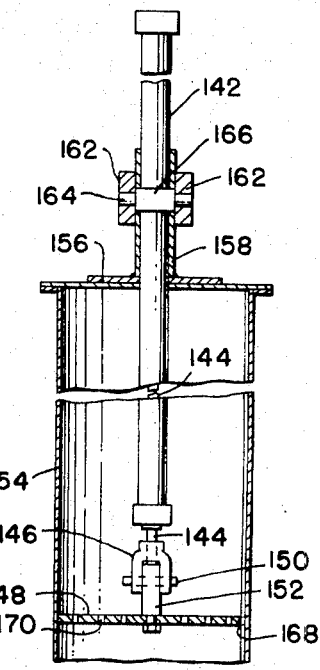
FIGURE 10 is a vertical sectional view taken on line 10—10 of FIGURE 3.
Figure 4:
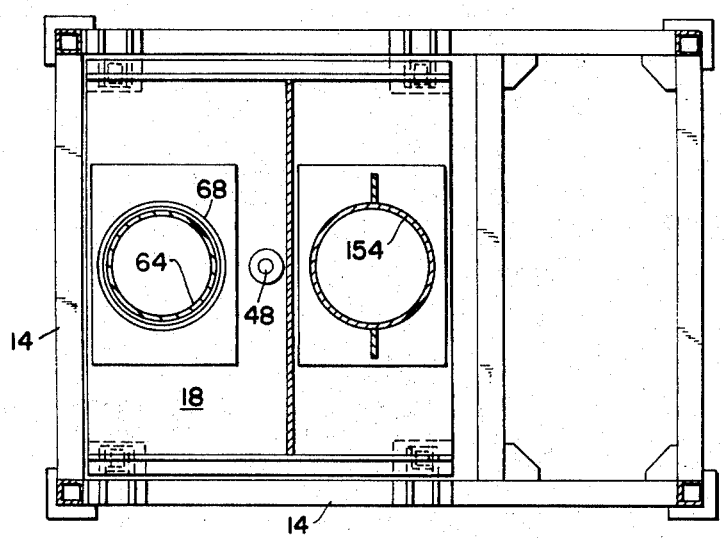
FIGURE 4 is a horizontal sectional view taken on line 4—4 of FIGURE 2.
Figure 5:
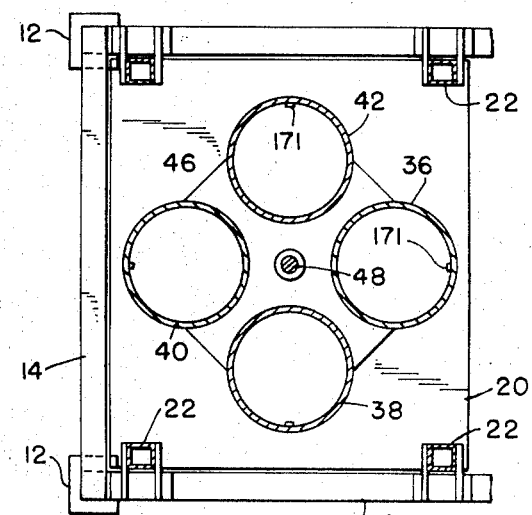
FIGURE 5 is a horizontal sectional view taken on line 5—5 of FIGURE 2.
Figure 6:
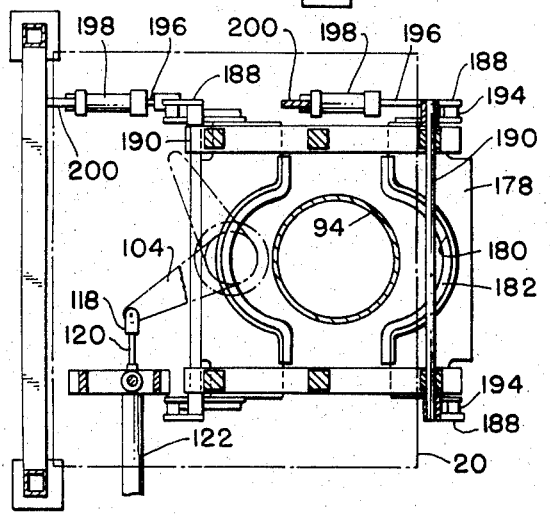
FIGURE 6 is a horizontal sectional view taken on line 6—6 of FIGURE 2.

The machine is mounted on a lower supporting frame 10 consisting of legs 12 and connecting horizontal frame members 14. A main frame 16 is mounted on the lower frame 10 and comprises an upper plate 18 and a lower plate 20 connected by four vertical frame members 22 at the corners of the plates 18 and 20. Brackets 24 are welded to the vertical frame members 22 and rest upon and are secured to the horizontal frame members 14 of the lower frame 10. A hopper supporting frame 26 is also mounted on the lower frame 10 and comprises four vertical frame members 28 connected at their upper ends by horizontal frame members 30. The framework further includes a frame 32 disposed below and supported by the main frame 16 for supporting the bag clamping mechanism later described.

A rotor unit indicated at 34 is disposed between the upper and lower support plates 18 and 20 and includes four cylindrical chutes or containers 36, 38, 40 and 42, such containers being open at their upper and lower ends and secured together by an upper circular plate 44 and a lower plate 46. A center spindle 48 is rotatably journaled in a lower bushing 50 on the lower support plate 20 and is journaled at its upper end in a bearing 52 in the upper support plate 18. The spindle 48 is keyed to a sleeve 54 by a key 56 and the plate 46 is secured to the sleeve 54. A similar keyed connection is provided at the upper end of the spindle 48 to key the plate 44 to the spindle so that upon rotation of the spindle 48 the rotor unit 34 will be rotated with the spindle.

A hopper 60 is mounted on the hopper support frame 26 and includes a cylindrical upper section 62 connected to a lower and smaller diameter spout section 64 by a conical section 66. The lower end of the spout section 64 is provided with a discharge spout 68 which extends downwardly through an opening 70 in the upper support plate 18 and terminates just above the upper surface of the upper plate 44 of the rotor unit 34. The plate 44 is provided with openings 72 in alignment with the upper ends of the containers.

A conveyor indicated at 74, preferably a screw type conveyor, is adapted to discharge material to be packaged into the upper hopper section 62. The construction of the conveyor 74 is not illustrated herein, but the conveyor may be continuously operated to provide a continuous supply of the material to be packaged into the hopper.

The cover plate 76 of the hopper carries a motor mount 78 on which an electric motor 80 is carried. The motor 80 includes a drive shaft 82 which extends downwardly through the hopper 60. The shaft 82 carries a series of radially extending paddles 84 within the hopper sections 62 and 66 for agitating the material within the hopper to keep it flowing downwardly through the hopper. The drive shaft 82 is journaled in a bearing 86 carried by a spider 88 within the lower end of the conical section 66. At its lower end the drive shaft 82 is provided with helical blades 90 which upon rotation of the shaft feed the material downwardly through the discharge spout 68.

The lower support plate 20 is provided with an opening 92 which communicates with a bag spout 94 secured on the under side of the plate 20. The opening 92 in plate 20 and the opening 70 in the upper support plate 18 are spaced equidistant from the vertical axis of spindle 48 but are offset 180° from each other. The containers 36, 38, 40 and 42 are symmetrically disposed about the spindle 48 and their vertical axes are spaced from the spindle axis the same distance as the centers of the openings 70 and 92 in the upper and lower plates 18 and 20. When one of the containers is positioned in alignment with the discharge spout 68 of the hopper, a different container will therefore be in alignment with the bag spout 94. The rotor unit 34 is indexed through a number of positions corresponding to the number of containers used in the machine, and in the illustrated embodiment the rotor unit is indexed through 90° during each cycle of operation. Therefore, when the container 40 is positioned beneath the hopper 60 as shown in the drawings, the hopper will discharge material into the container 40 to fill the same with a measured amount of material. At the same time the container 36 is positioned over the bag spout 94 for discharge of the material therein into a bag 95 on the bag spout. In the next cycle of operation the container 38 which is now empty will be brought into registry with the hopper discharge spout and the filled container 42 will be brought into registry with the bag spout 94.

Figure 8:
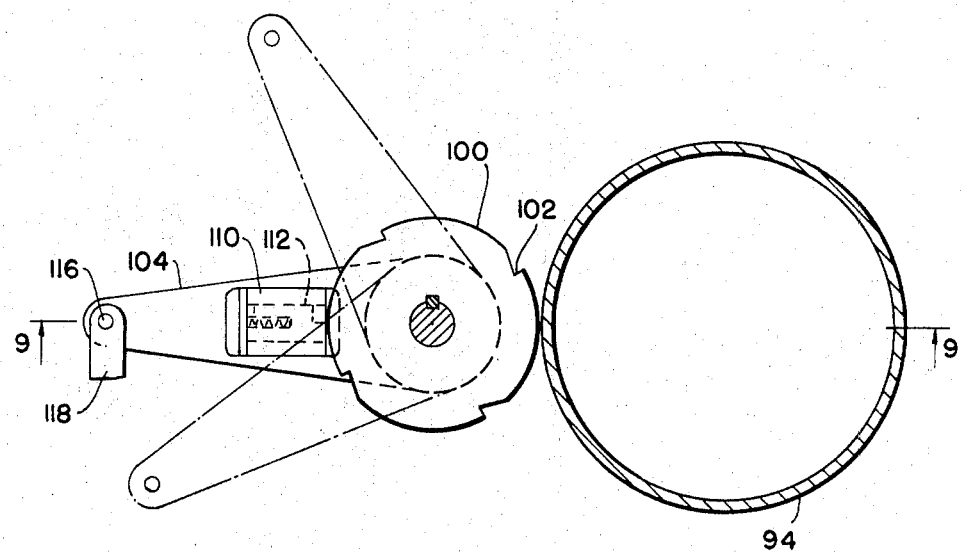
FIGURE 8 is a horizontal sectional view taken on line 8—8 of FIGURE 9.
Figure 9:
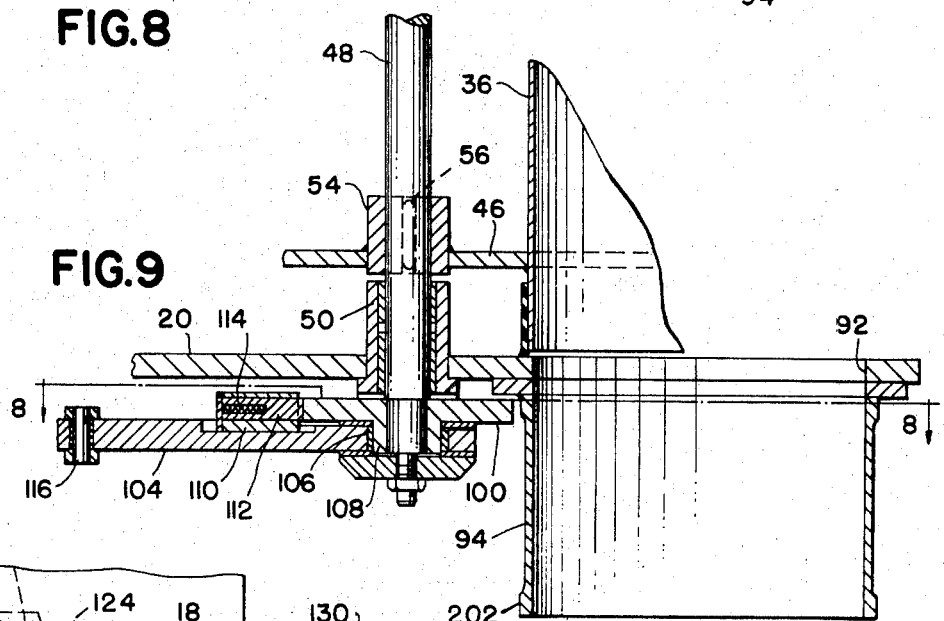
FIGURE 9 is a vertical sectional view taken on line 9—9 of FIGURE 8.

The indexing mechanism for rotating the rotor unit in the manner described above is illustrated in FIGURES 8 and 9 and comprises a ratchet 100 keyed onto the lower end of the drive spindle 48 and provided with four equally spaced notches 102. An arm 104 is journaled on a bearing 106 mounted on the hub 108 of the ratchet plate 100. The arm 104 carries a block 110 having an axially slidable pawl 112 disposed within a bore extending through the block 110. The pawl 112 is urged inwardly toward the ratchet plate 100 by a spring 114. When the arm is rotated in a counterclockwise direction as shown in FIGURE 8, the pawl 112 will disengage from one of the notches 102 and ride around the outer periphery of the ratchet 100 to engage behind the next notch 102. Subsequent rotation of the arm 104 in a clockwise direction will turn the ratchet 100 through 90°, thereby rotating the rotor unit 34 through 90°.

The outer end of arm 104 is provided with a pivotal connection 116 with the outer end 118 of a piston rod 120 extending from an air cylinder 122. The piston rod 120 is alternately extended and retracted by the air cylinder 122 to effect the indexing of the rotor unit 34. The cylinder 122 is pivoted on a vertical axis to a portion of the framework to accommodate the rotary movement of arm 104.

Figure 12:
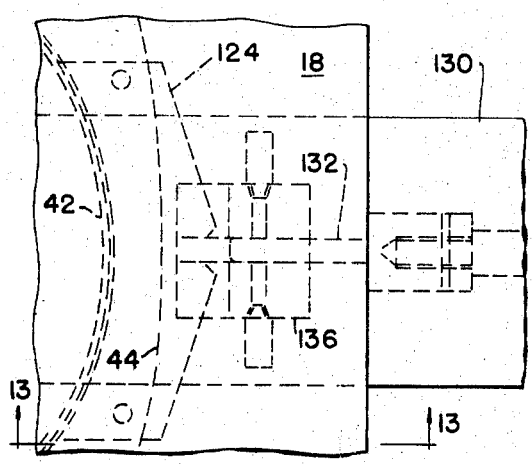
FIGURE 12 is an enlarged fragmentary sectional view taken on line 12—12 of FIGURE 3.
Figure 13:
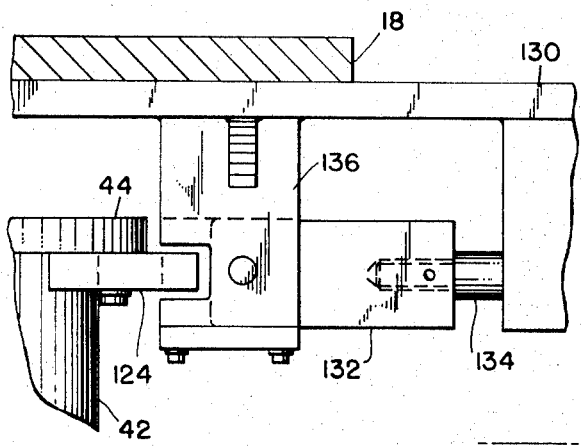
FIGURE 13 is a vertical sectional view taken on line 13—13 of FIGURE 12.
Figure 11:
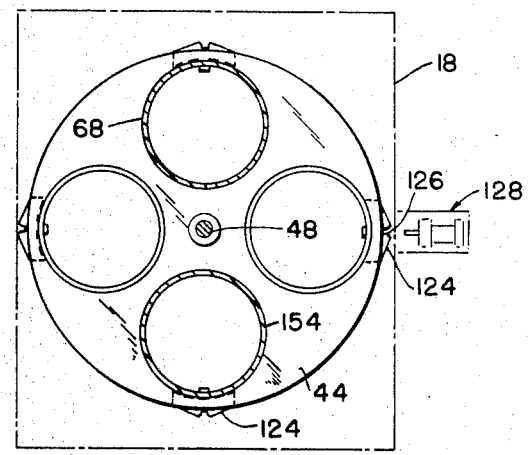
FIGURE 11 is a horizontal sectional view taken on line 11—11 of FIGURE 3.

The under side of the upper rotor plate 44 is provided with four detent plates 124, each of which has a notch 126 therein. A detent cylinder 128 is supported on a bracket 130 secured on the under side of plate 18. The detent mechanism is illustrated in FIGURES 11, 12 and 13 and comprises a detent block 132 mounted on the outer end of the piston 134 of the detent cylinder 128. The detent block 132 is slidable through a guide block 136 secured to the bracket 130. When the air cylinder 128 is actuated to extend the piston rod 134, the detent block 132 will enter into the notch 126 on one of the detent plates 124 to lock the rotor unit against movement while the filling and discharge operations are being carried out.

A vertically reciprocable ram means indicated generally at 140 is mounted on the upper support plate 18 in vertical alignment with the bag spout 94. The ram comprises an air cylinder 142 having a piston rod 144 extending therefrom and carrying a yoke 146 at its lower end and to which a circular plate 148 is pivotally connected by a pin 150 which extends through the arms of the yoke 146 and a stub shaft 152 secured on the upper surface of the plate 148. A ram guide in the form of a cylinder 154 is mounted on the upper surface of plate 18 and a strap 156 extends across the upper end of the guide cylinder 154. A sleeve 158 extends upwardly from the strap 156 and around the air cylinder 142. A pair of vertical support brackets 160 have secured thereto at a selected vertical height a pair of cross arms 162 and the cylinder 142 is pivotally secured to such cross arms by pins 164 which extend therethrough and into a block 166 through which the air cylinder 142 extends. In this manner the vertical position of the air cylinder 142 may be adjusted so as to vary the extent of the downward stroke of the ram if desired. The plate 148 and the inner wall of the guide cylinder 154 are provided with one or more cooperating keyway means as indicated at 168 to keep the ram properly aligned within the guide. The plate 148 is provided with a series of apertures 170 to allow the escape of air therethrough.

The ram guide 154 extends downwardly through an opening in the upper support plate 18 in alignment with the bag spout 94. When a filled container is brought into registry with the bag spout through the indexing mechanism previously described and assuming that a bag has been placed on the bag spout 94 and clamped thereto by the clamping mechanism to be described, the ram cylinder 142 is actuated to force the ram downwardly into the open upper end of the container in the discharge position to forcibly drive the packed material downwardly through the container and the bag spout 94 into the bag to be filled. At the same time the container positioned 180° from the container being emptied will be filled from the hopper 60. At the completion of this operation the filled bag is released from the bag spout and carried away by a conveyor 172 located beneath the bag spout, the ram is retracted, another bag is positioned on the spout and clamped thereto, and the rotor unit is then indexed through 90° to start another cycle of operation. Each of the containers 36, 38, 40 and 42 is provided with an inwardly extending key 171 similar to the key in the ram guide 154 to cooperate with the keyway means on ram plate 148 as the latter moves through the containers.

The bag clamping mechanism includes the frame 32 which is comprised of a forward portion 174 on one side of the bag spout and a similar but inverted frame portion 176 disposed on the opposite side of the bag spout. The two halves of the clamping mechanism are essentially similar in construction and operation and each comprises a plate member 178 having a semicircular recess or cutout portion 180 lined with a gripping element 182 made of rubber or similar material. The clamping members are slidable laterally toward and away from the bag spout 94 between vertically spaced guides 184 mounted on the framework. Each clamping member 178 is provided with a pair of lever arms 188 which are keyed to a shaft 190 journaled on the frame members. The other ends of lever arms 188 are pivotally connected as at 192 to trunnions 194 on opposite sides of the clamping plate 178.

One arm 188 of each pair of arms is provided intermediate its ends with a pivotal connection with the outer end of a piston rod 196 operating within an air cylinder 198 which is pivotally connected to a bracket 200 secured to a suitable portion of the framework. When the pistons 196 are extended or retracted, the lever arms 188 will be pivoted to slide the clamping members 178 toward or away from the bag spout 94. The lower end of the bag spout is provided with a bead 202 which is below the portion of the bag spout engaged by the clamping members so that the bag will be securely clamped against the bag spout and will not be pulled therefrom when the ram drives the material downwardly into the bag.

The bag clamping mechanism, the detent mechanism, the ram device, the hopper feed, and the rotor unit are all power operated and suitable controls, limit switches and the like are provided to operate such devices in properly timed sequence to obtain continuous and automatic operation of the machine. Such controls are well known in the art and are not illustrated herein since they form no part of the present invention.

What I claim as my invention is:

1. In a machine for filling bags with non-free-flowing material such as shredded bark or the like, a rotor assembly including a plurality of containers open at their upper and lower ends and symmetrically disposed about a vertical axis for rotation as a unit about said axis, a feed hopper above said rotor assembly, a conveyor for feeding material into said hopper and means in said hopper for effecting the flow of said material downwardly through said hopper, a stationary bag spout below said rotor assembly and adapted to receive the neck of a bag into which the material is discharged through said spout, means for clamping a bag to said bag spout, indexing means for rotating said rotor assembly through a number of positions corresponding to the number of said containers to successively position a container in alignment with said hopper while a different one of said containers is brought into alignment with said bag spout, and ram means above said rotor assembly in alignment with said bag spout adapted to be driven downwardly through the container positioned in alignment with said bag spout and into said bag to compress the material in said bag.

2. A machine according to claim 1 wherein said hopper is provided with power operated means to effect the flow of material downwardly therethrough into a container.

3. A machine according to claim 1 including detent means for locking said rotor unit against rotation in each of said positions.

4. A machine according to claim 1 wherein said ram means includes a vertically reciprocable, horizontally disposed piston member engageable with the material in the container and having a series of apertures therein.

5. A machine according to claim 4 wherein said piston member closely fits the inner wall of said containers.

6. A machine according to claim 5 wherein said ram means includes a guide means cooperable with said piston member for aligning the latter with the container.

7. A machine according to claim 4 including cooperating keyway means on said piston member and said containers.

8. A machine according to claim 1 wherein said bag clamping means comprises a pair of clamping members movable in opposite directions toward and away from said bag spout, and power operated means for effecting movement of said clamping members.

9. In a machine for filling bags with non-free-flowing material such as shredded bark or the like, a frame including upper and lower support plates, a rotor assembly disposed between said plates and including a plurality of cylindrical containers open at their upper and lower ends and symmetrically disposed about a vertical axis for rotation as a unit about said axis, said upper plate having an opening therein and a feed hopper above said upper plate and having a discharge spout in alignment with said opening, a conveyor for feeding material into said hopper and means in said hopper for effecting the flow of said material downwardly through siad discharge spout, said lower plate having an opening therein angularly offset from the opening in said upper plate, a bag spout below the opening in said lower plate and adapted to receive the neck of a bag into which the material is discharged through said spout, means for clamping a bag to said bag spout, indexing means for rotating said rotor assembly through a number of positions corresponding to the number of said containers to successively bring each container into alignment with said hopper discharge spout while a different one of said containers is brought into alignment with said bag spout, and power operated means for driving the material in the container positioned in alignment with said bag spout downwardly out of said container and through said bag spout into said bag to compress the material in said bag.

10. A machine according to claim 9 wherein the lower ends of said containers are adapted to sweep over the upper surface of said lower plate upon rotation of said rotor assembly.

11. A machine according to claim 9 wherein said hopper discharge spout extends through said opening in said upper plate into close proximity to the upper ends of said containers.

12. A machine according to claim 9 wherein said power operated means comprises a vertically reciprocable ram.

13. A machine according to claim 12 wherein said upper plate has a second opening therein in alignment with the opening in said lower plate and said ram is mounted on said upper plate in alignment with said second opening.

14. A machine according to claim 13 wherein said ram includes a piston member engageable with the material in a container and closely fitting the inner wall of the container.

15. A machine according to claim 14 including means cooporable with said piston member for aligning the same with the container positioned over said bag spout.

16. a machine according to claim 9 wherein said rotor assembly includes a vertically disposed spindle rotatably mounted at its opposite ends in said upper and lower plates, said containers being rotatable with said spindle, a ratchet secured to said spindle below said lower plate, an arm rotatable on the spindle axis and having a pawl thereon engageable with said ratchet, and power operated means for oscillating said arm to index said rotor assembly.

17. A machine according to claim 16 including detent means for locking said rotor assembly in each of the positions to which the latter is moved by said indexing means.

18. In a machine for filling bags with non-free-flowing material such as shredded bark or the like, a plurality of cylindrical containers open at their upper and lower ends and symmetrically disposed about a vertical axis for movement as a unit through a circular path about said axis, a feed hopper having a discharge spout disposed at one position on said path but above the upper ends of said containers, a bag spout at a different position on said path but disposed below the lower ends of said containers and adapted to receive the neck of a bag, means for clamping a bag to said bag spout, power operated means for rotating said containers along said path to position one container in alignment with said hopper discharge spout while a different one of said containers is brought into alignment with said bag spout, means in said hopper for effecting the flow of said material downwardly through said discharge spout and into the container in alignment therewith, and a power operated vertically reciprocable ram above and in alignment with said bag spout adapted to be driven downwardly through the container positioned in alignment with said bag spout to forcibly expel the material therein into said bag and to compress the material in said bag.

References Cited

UNITED STATES PATENTS

| | | | |
|---|---|---|---|
| 2,539,635 | 1/1951 | Ritchie | 141—131 X |
| 2,623,677 | 12/1952 | Treff | 222—217 X |
| 2,656,966 | 10/1953 | McDonough et al. | 222—217 X |

FOREIGN PATENTS

| | | |
|---|---|---|
| 493,219 | 4/1954 | Italy. |

HOUSTON S. BELL, JR., Primary Examiner

U.S. Cl. X.R.

222—216, 370; 141—261, 315